United States Patent
Medagliani et al.

(10) Patent No.: US 10,708,169 B2
(45) Date of Patent: Jul. 7, 2020

(54) CONSTRAINED DISJOINT PATH COMPUTATION

(71) Applicant: HUAWEI TECHNOLOGIES CO., LTD., Shenzhen (CN)

(72) Inventors: Paolo Medagliani, Boulogne-Billancourt (FR); Stefano Paris, Boulogne-Billancourt (FR); Jeremie Leguay, Boulogne-Billancourt (FR); Ioannis Steiakogiannakis, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 15/906,821

(22) Filed: Feb. 27, 2018

(65) Prior Publication Data

US 2018/0191602 A1  Jul. 5, 2018

Related U.S. Application Data

(63) Continuation of application No. PCT/EP2015/074383, filed on Oct. 21, 2015.

(51) Int. Cl.
 *H04L 12/735* (2013.01)
 *H04L 12/721* (2013.01)
 *H04L 12/707* (2013.01)
 *H04L 12/717* (2013.01)

(52) U.S. Cl.
 CPC .......... *H04L 45/128* (2013.01); *H04L 45/124* (2013.01); *H04L 45/24* (2013.01); *H04L 45/42* (2013.01)

(58) Field of Classification Search
 CPC ........... H04L 45/12–1287; H04L 45/24; H04L 45/42; H04L 41/0654–0663; H04L 69/40
 See application file for complete search history.

(56) References Cited

U.S. PATENT DOCUMENTS

| | | |
|---|---|---|
| 6,542,469 B1 | 4/2003 | Kelley et al. |
| 7,020,086 B2 | 3/2006 | Juttner et al. |
| (Continued) | | |

FOREIGN PATENT DOCUMENTS

| | | |
|---|---|---|
| CN | 1738291 A | 2/2006 |
| CN | 1825820 A | 8/2006 |
| (Continued) | | |

OTHER PUBLICATIONS

Luo et al.,"An adaptive multi-path computation framework for centrally controlled networks",Computer Networks 83, pp. 30-44, Elsevier Inc. (2015).

(Continued)

*Primary Examiner* — Eric Myers
(74) *Attorney, Agent, or Firm* — Leydig, Voit & Mayer, Ltd.

(57) ABSTRACT

A method, an apparatus and a non-transitory computer-readable storage medium for determining multiple disjoint constrained paths in a communications network are disclosed. The method includes selecting upper bounds QoS metrics for each path in a disjoint combination of paths having two or more disjoint paths between a source node and a destination node; determining a minimum-cost disjoint path combination, and a minimum-QoS metric disjoint path combination; computing a maximum QoS metric by summing the QoS metrics of each minimum-cost path in the minimum-cost disjoint path combination, and computing a minimum QoS metric by summing the QoS metrics of each minimum-QoS metric path in the minimum-QoS metric disjoint path combination.

17 Claims, 5 Drawing Sheets

(56) References Cited

U.S. PATENT DOCUMENTS

| | | |
|---|---|---|
| 7,397,761 B2 | 7/2008 | Kar et al. |
| 7,813,270 B2 | 10/2010 | Acharya et al. |
| 8,243,604 B2 | 8/2012 | Kothari et al. |
| 8,681,634 B2 | 3/2014 | Zhang et al. |
| 2003/0227877 A1 | 12/2003 | Kar et al. |
| 2004/0042473 A1* | 3/2004 | Park .................. H04L 45/00 370/408 |
| 2004/0205239 A1* | 10/2004 | Doshi ............... H04J 14/0227 709/241 |
| 2015/0249591 A1 | 9/2015 | Alvarez et al. |

FOREIGN PATENT DOCUMENTS

| | | |
|---|---|---|
| CN | 102439920 A | 5/2012 |
| EP | 2750337 B1 | 3/2017 |

OTHER PUBLICATIONS

Peng et al., "A New Approximation Algorithm for Computing 2-Restricted Disjoint Paths", IEICE Transactions on Information and Systems, vol. E90, No. 1, pp. 1-8 (Jan. 2007).

Abe et al.,"k-Maximally Disjoint Path Routing Algorithms for SDN",2015 International Conference on Cyber-Enabled Distributed Computing and Knowledge Discovery, pp. 499-508, Institute of Electrical and Electronics Engineers, New York, New York (2015).

Bhandari, Optimal Diverse Routing in Telecommunication Fiber Networks, IEEE Computer and Communications Societies, INFOCOM, pp. 1498-1508, Institute of Electrical and Electronics Engineers, New York, New York (1994).

Xu et al., "On Finding Disjoint Paths in Single and Dual Link Cost Networks," IEEE Computer and Communications Societies INFOCOM, pp. 705-715, Institute of Electrical and Electronics Engineers, New York, New York (2004).

Guo et al., "Link-disjoint paths for reliable QoS routing", International Journal of Communication Systems 16.9 (2003).

Bhatia et al., "Finding disjoint paths with related path costs," Journal of Combinatorial Optimization (2006).

Xiao et al. "Constrained Shortest Link-Disjoint Paths Selection: A Network Programming Based Approach," IEEE Transactions on Circuits and Systems, vol. 53, Issue. 5, pp. 1-14, Institute of Electrical and Electronics Engineers, New York, New York (May 2006).

* cited by examiner

CONSTRAINED DISJOINT PATH COMPUTATION

CROSS-REFERENCE TO RELATED APPLICATIONS

This application is a continuation of International Application No. PCT/EP2015/074383, filed on Oct. 21, 2015, the entire content of which is hereby incorporated by reference in its entirety.

TECHNICAL FIELD

The present disclosure relates to communication networks generally and to constrained disjoint path computation methods and apparatus in particular.

BACKGROUND

In Software Defined Networking (SDN) or Path Computation Element (PCE) architectures such as in a SDN network architecture, SDN routers and SDN switches may interact over a communications network using a centralized SDN controller which may decide the route that new incoming demands should take.

SUMMARY

A method, an apparatus and a non-transitory computer-readable storage medium for determining multiple disjoint constrained paths in a communications network are disclosed.

According to a first aspect, a method of determining multiple disjoint constrained paths in a communications network is provided. The method may include selecting upper bounds of Quality of Service (QoS) metrics for each path in a disjoint combination of paths comprising two or more disjoint paths between a source node and a destination node; determining a minimum-cost disjoint path combination and a minimum-QoS metric disjoint path combination; computing a maximum QoS metric by summing the QoS metrics of each minimum-cost path in the minimum-cost disjoint path combination, and computing a minimum QoS metric by summing the QoS metrics of each minimum-QoS metric path in the minimum-QoS metric disjoint path combination; determining minimum-cost disjoint path combinations within an interval between the maximum QoS and the minimum QoS; and selecting, from the minimum-cost disjoint path combinations within the interval, combinations comprising paths wherein the QoS metric of each path is within the upper bounds.

According to a second aspect, an apparatus for determining multiple disjoint constrained paths in a communications network is provided. The apparatus may include a processor and a non-transitory computer readable medium storing instructions that are executable by the processor.

The processor may be configured to perform: selecting upper bounds of QoS metrics for each path in a disjoint combination of paths comprising two or more disjoint paths between a source node and a destination node; determining a minimum-cost disjoint path combination, and a minimum-QoS metric disjoint path combination; computing a maximum QoS metric by summing the QoS metrics of each minimum-cost path in the minimum-cost disjoint path combination, and computing a minimum QoS metric by summing the QoS metrics of each minimum-QoS metric path in the minimum-QoS metric disjoint path combination; determining minimum-cost disjoint path combinations within an interval between the maximum QoS and the minimum QoS; and selecting, from the all minimum-cost disjoint path combinations within the interval, combinations comprising paths wherein the QoS metric of each path is within the upper bounds.

According to a third aspect, a non-transitory computer-readable storage medium having stored therein instructions for determining multiple disjoint constrained paths in a communications network is provided.

The instructions, when executed by a processor, may cause the processor to select upper bounds of QoS metrics for each path in a disjoint combination of paths comprising two or more disjoint paths between a source node and a destination node; determine a minimum-cost disjoint path combination, and a minimum-QoS metric disjoint path combination; compute a maximum QoS metric by summing the QoS metrics of each minimum-cost path in the minimum-cost disjoint path combination, and compute a minimum QoS metric by summing the QoS metrics of each minimum-QoS metric path in the minimum-QoS metric disjoint path combination; determine minimum-cost disjoint path combinations within an interval between the maximum QoS and the minimum QoS; and select, from the all minimum-cost disjoint path combinations within the interval, combinations comprising paths wherein the QoS metric of each path is within the upper bounds.

It is to be understood that both the foregoing general description and the following detailed description are exemplary only and are not restrictive of the present disclosure.

BRIEF DESCRIPTION OF THE DRAWINGS

The subject matter regarded as the disclosure is particularly pointed out and distinctly claimed in the concluding portion of the specification. The disclosure, however, both as to organization and method of operation, together with objects, features, and advantages thereof, may best be understood by reference to the following detailed description when read with the accompanying drawings in which:

Figure 1:
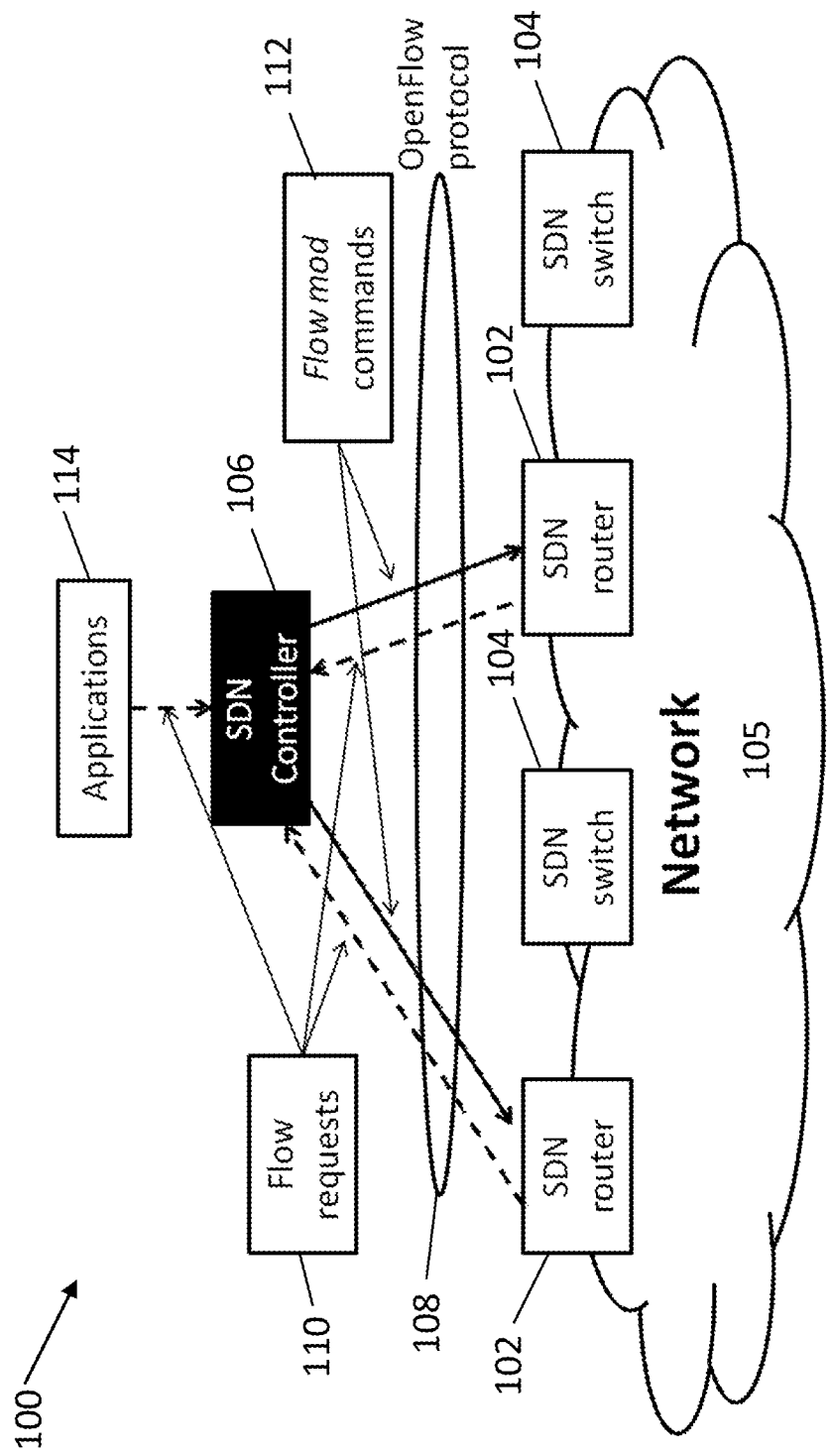
FIG. 1 schematically illustrates an exemplary SDN network architecture.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure.

Unless specifically stated otherwise, as apparent from the following discussions, it is appreciated that, throughout the specification, discussions utilizing terms such as "processing", "computing", "calculating", "determining" or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Examples of the present disclosure may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, examples of the present disclosure are not described with reference to any particular programming language. It will be appreciated that a variety of programming languages may be used to implement the teachings of the disclosure as described herein.

In Software Defined Networking (SDN) or Path Computation Element (PCE) architectures, for example as shown by SDN network architecture 100 in FIG. 1, SDN routers 102 and SDN switches 104 may interact over a communications network 105 with a centralized SDN controller 106 which may decide the route that new incoming demands should take. SDN network architecture 100 may use a communications protocol such as OpenFlow protocol 108 to enable standardized interactions within the south-bound interface of SDN controller 106. Using OpenFlow protocol 108, for each packet handled by a SDN switch 102, a flow request 110 may be issued to SDN controller 106. SDN controller may reply with allow mod message 112 to update routing tables of SDN routers 102 and SDN switches 104. In addition, SDN controller 106 may proactively configure routes in communications network 105 answering requests from applications 114 through the north-bound interface.

SDN and PCE architectures are frequently used in multimedia applications which may include video or voice streaming. These types of applications typically require bounding the latency between emission and reception of data in order to guarantee a satisfying Quality of Experience (QoE) to final users.

Generally, the SDN controller is in charge of performing path computations, determining primary and backup paths which meet given Quality of Service (QoS) constraints while attempting to provide an optimal solution within a given time frame satisfying QoE. The SDN controller may include a fast-path computation module which is able to compute paths in a network that attempt to satisfy the constraints associated with the application. For example, if one of the constraints is that service continuity is maintained if there is a failure in a primary path, a delay requirement associated with the primary path may be similarly applied to the backup paths.

Finding an optimal solution to the problem of determining primary and backup paths which satisfy the constraints of an application is generally Non-deterministic Polynomial-time hard (NP-hard). Some metaheuristics have been developed and have been used to attempt to solve the problem of constrained optimization in path routing. These include the Lagrangian relaxation method, the Suurballe algorithm, and the Dijkstra algorithm, among others. Examples of some applications of these metaheuristics to constrained path routing are described below.

IEICE Transactions on Information and Systems 90.2 (2007), pp. 465-472, "A New Approximation Algorithm For Computing 2-Restricted Disjoint Paths", by Peng, Shen; is related to " . . . an approximation algorithm for [identifying multiple disjoint paths that have the minimum total cost OPT and satisfy a delay bound D in a graph G] by using the Lagrangian Relaxation method and an approximation algorithm for finding multiple link-disjoint paths that satisfy the delay constraints at a reasonable total cost. If the optimal solution is under delay-bound D has a cost OPT, the algorithm can find a solution who delay is bounded by $(1+1/k)D$ and the cost is no more than $(1+k)OPT$".

U.S. Pat. No. 7,020,086 to Juttner et al. is related to "A method for practical QoS routing, which provides a solution to the delay constrained least cost routing problem, is presented. The method uses the concept of aggregated costs and finds the optimal multiplier based on Lagrange relaxation. The method is polynomial in running time, and produces a theoretical lower bound (i.e. optimal solution), along with the result. The differences between the lower bound and result are small, indicating the quality of the result. Additionally, by further relaxing the desire for an optimal solution, an option is provided to control the trade-off between running time of the algorithm and quality of the result".

U.S. Pat. No. 8,243,604 to Kothari et al. is related to "A method for communication includes simultaneously computing a shortest path and a backup path through a network between a pair of nodes. Packets are routed through the network using at least one path selected from among the shortest path and the backup path".

Other examples are described in US Patent Application Publication No. US20030227877 A1; U.S. Pat. No. 7,813,270 B2; U.S. Pat. No. 8,681,634 B2; Bhandari, Ramesh, "Optimal diverse routing in telecommunication fiber networks", IEEE INFOCOM, 1994; Xu, Dahai, et al. "On finding disjoint paths in single and dual link cost networks", IEEE INFOCOM, 2004; Guo, Yuchun, Fernando Kuipers, and Piet Van Mieghem, "Link-disjoint paths for reliable QoS routing", International Journal of Communication Systems 16.9 (2003), 779-798; and Bhatia, Randeep, Murali Kodialam, and T. V. Lakshman, "Finding disjoint paths with related path costs", Journal of Combinatorial Optimization 12.1-2 (2006), 83-96.

Applicants have realized that methods suitable for computing multiple disjoint constrained paths either respect a single QoS metric (constraint) for a path, or respect a sum of weights of a QoS metric for a primary path and backup paths. For example, methods based on Lagrangian relaxation of an Integer Linear Programming (ILP) formulation generally guarantee the respect of one constraint on a path while if, combined with the Suurballe algorithm to generate multiple disjoint paths, the respect of the constraint is then substantially guaranteed only for the sum of weights on the primary and backup paths. Applicants have further realized that these methods are unable to substantially guarantee the respect of QoS constraints on each path of multiple disjoint constrained paths, that is, the QoS constraint of each path (e.g. primary path and backup path) may not be respected individually.

According to an example of the present disclosure, a space of candidate solutions respecting the constraints on both primary and backup paths may be generated by running parallel instances of a disjoint-path generation algorithm disclosed herein, wherein primary and backup paths may be treated as a single circuit from source to destination. This "circuit" may feed a Lagrangian-based algorithm to create a set of paths respecting given constraints on each path. Finally, a least-cost solution may be chosen among a set of feasible candidates. In implementing the algorithm, the space of candidate solutions may be derived by choosing a QoS constraint within an interval $\Delta max - \Delta min$ where $\Delta max$ is the maximum QoS metric value achievable by a path in a disjoint pair of paths that minimize non-cost-related constraints, and $\Delta min$ is the minimum QoS metric value achievable by a path that minimizes cost.

It may be appreciated that Applicants' method and apparatus are particularly advantageous as they may be used to compute the least cost link-disjoint primary and backup (also multiple) paths under delay constraints requirements where each path respects a given delay constraint. They may additionally be used to compute primary and backup (also multiple) paths considering two edge weights such as, for example, cost and delay or cost and number of hops. Furthermore, they may be used to compute a primary and backup (also multiple) paths where a sum of costs is minimized and each path respect the QoS constraint individually.

Figure 2:
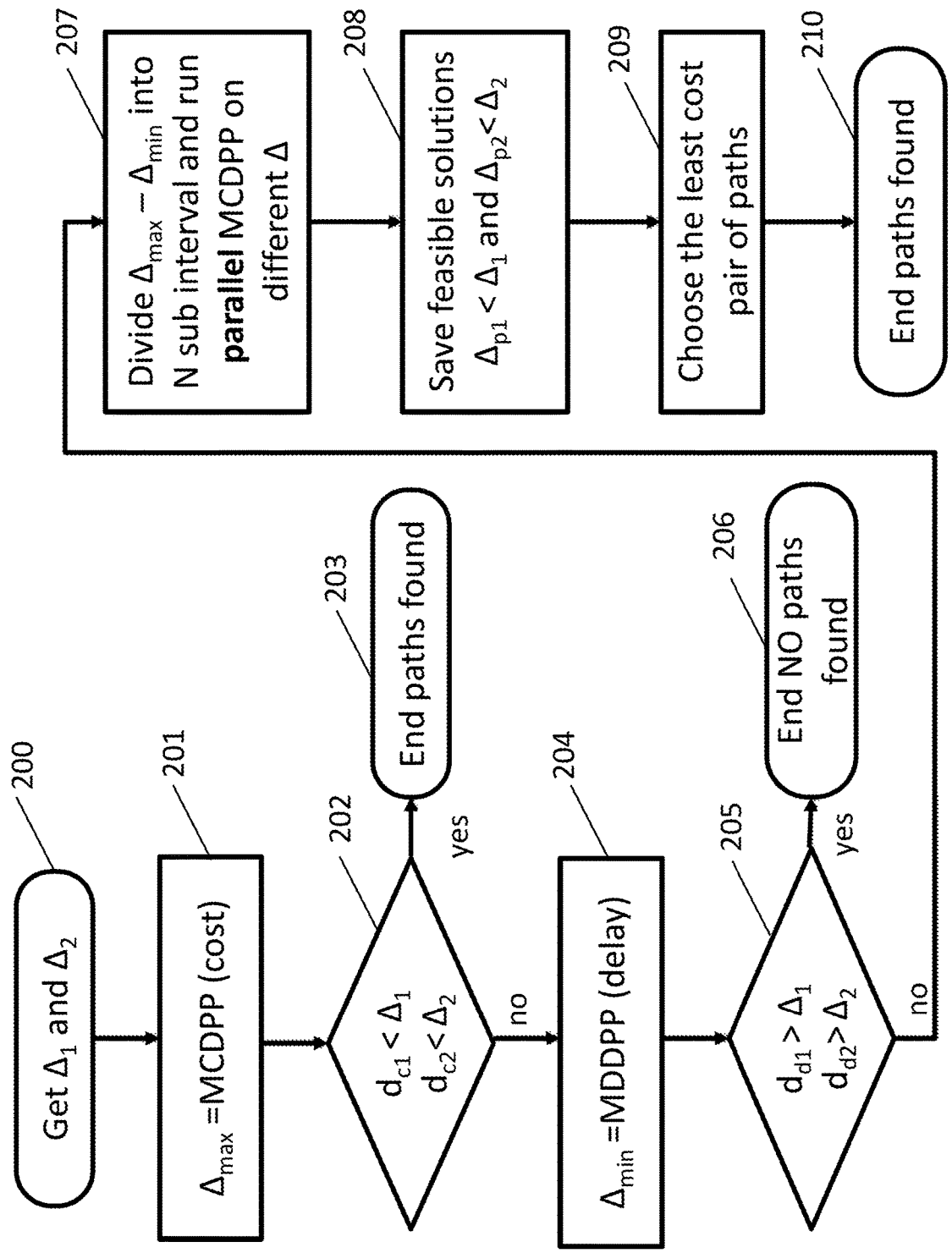
FIG. 2 schematically is a flow chart of a method of computing disjoint constrained paths in a communications network, according to an example of the present disclosure.

Reference is now made to FIG. 2 which is a flow chart of an exemplary method of computing multiple disjoint constrained paths in a communications network, according to an example of the present disclosure. The exemplary method is described with reference to a two path disjoint-path combination, although the method may be similarly applied to constrained disjoint path combinations having more than 2 disjoint paths, for example, 3, 4, 5, 10, 20, 50, 100, 1000, or more, as described further on below.

At 200, non-cost-related QoS metrics may be selected as upper bound constraints to be respected on the primary path and backup paths, respectively, between a source and a destination node in a communications network. Examples of the upper-bound QoS metrics $\Delta 1$ and $\Delta 2$ may include delay, number of hops, bandwidth, and availability, among other non-cost-related QoS metrics associated with communications networks.

At 201, a minimum-cost disjoint pair of paths (MCDPP) is determined between the source and destination node. For this MCDPP, $\Delta max$ may be determined given by $\Delta max = dc1 + dc2$ where $dc1$ and $dc2$ may be the non-cost related QoS metrics of the primary path and backup path in MCDPP, respectively.

At 202, an evaluation may be made of MCDPP and the values of $dc1$ and $dc2$ are compared to the upper-bound QoS metrics $\Delta 1$ and $\Delta 2$, respectively. If $dc1$ is less than $\Delta 1$ and $dc2$ is less than $\Delta 2$, continue to 203. Otherwise, continue to 204.

At 203, MCDPP may be determined to be a suitable constrained disjoint combination of paths between the source and destination satisfying all the QoS requirements and there is no need to compute additional pairs of paths. Further execution of the method is not required.

At 204, a minimum-QoS disjoint pair of paths may be determined between the source and destination node. The minimum-QoS disjoint pair of paths may be determined taking into consideration minimum cost in addition to the minimum QoS. For example, the minimum-QoS disjoint pair of paths may be determined based on minimum delay in addition to minimum cost, that is, a minimum-delay disjoint pair of paths (MDDPP) may be determined. For this MDDPP, $\Delta min$ may be determined given by $\Delta min = dd1 + dd2$ where $dd1$ and $dd2$ are the non-cost related QoS metrics (i.e. delay) of the primary path and backup path in MDDPP, respectively.

At 205, an evaluation may be made of the minimum-QoS disjoint pair of paths, for example, MDDPP and the values of $dd1$ and $dd2$ are compared to upper-bound metrics $\Delta 1$ and $\Delta 2$, respectively. If $dd1$ is greater than $\Delta 1$ and $dd2$ is greater than $\Delta 2$, continue to 206. If not, continue to 207 as a solution may be found in a space of candidates to be generated.

At 206, MDDPP may be determined to be an unsuitable constrained disjoint combination of paths between the source and destination as the QoS metrics associated with MDDPP (i.e. delay) exceed the threshold imposed by upper-bound QoS metrics $\Delta 1$ and $\Delta 2$. As the evaluation was based on the minimum-QoS disjoint pair of paths and the QoS metrics exceed the threshold, there may not be a feasible solution and therefore execution of the method may be finished.

At 207, in preparation for generating a space of candidates, the interval $\Delta max - \Delta min$ may be divided into subintervals and steps 204-206 may be repeated for each subinterval to determine minimum-cost disjoint pair of paths with different values for the upper bounds of the sum of non-cost-related QoS metrics of primary and backup paths. The steps may be repeated in parallel for all subintervals, sequentially for each subinterval, or a combination of both where the computations may be performed in parallel for groups of subintervals. A number of subintervals which may be used may vary and may be as small as 2 subintervals, and may range into the hundreds, thousands, and even larger number of subintervals.

At 208, the space of candidates may be generated by selecting all disjoint pairs of paths satisfying the criteria of having QoS metrics for the primary and back up paths with values less than the selected upper-bound QoS metrics $\Delta 1$ and $\Delta 2$.

At 209, a comparison may be performed between the candidates in the generated space of candidates to determine which one provides the least-cost solution.

At 210, the disjoint pair of paths offering the least-cost solution may be selected as the most feasible candidate. Execution of the method is completed.

For computing multiple disjoint constrained paths, for example k disjoint paths, the exemplary method described above may be practiced, in some examples of the present disclosure, with the following modifications:

At 200, k upper-bound constraints are selected associated with the k disjoint paths (i.e. $\Delta 1, \Delta 2, \Delta 3 \ldots \Delta k$).

At 201, $\Delta max$ may be determined given by $\Delta max = dc1 + dc2 + dc3 + \ldots + \Delta k$.

At 204, $\Delta min$ may be determined given by $\Delta min = dd1 + dd2 + dd3 + \ldots + ddk$.

At 208, the space of candidates may be generated by selecting all disjoint pairs of paths satisfying the criteria of having QoS metrics for the primary and back up paths with values less than the selected upper-bound QoS metrics $\Delta 1$, $\Delta 2, \Delta 3 \ldots \Delta k$.

It may be appreciated by the person skilled in the art that the exemplary method depicted in the flow chart and described above may be practiced, in some examples, with more or less steps, with steps arranged in a different sequence, or a combination thereof. For example, if processing power is available, steps 201 and 204 may be executed in parallel.

It may be additionally appreciated by the skilled person that numerous algorithms may be applied for generating disjoint paths and for computing disjoint paths respecting a given bound on a constraint, and that these algorithms may be applied to the exemplary method described above. For example, the Suurballe algorithm may be used to generate the disjoint paths and the LARAC algorithm may be used to compute the path given the constraints. Other algorithms which may be used in lieu of the Suurballe algorithm may include the Dijkstra algorithm and the k-shortest path algorithm, and in lieu of the LARAC algorithm may be the Binary Search algorithm and the Local Search algorithm.

Figure 3:
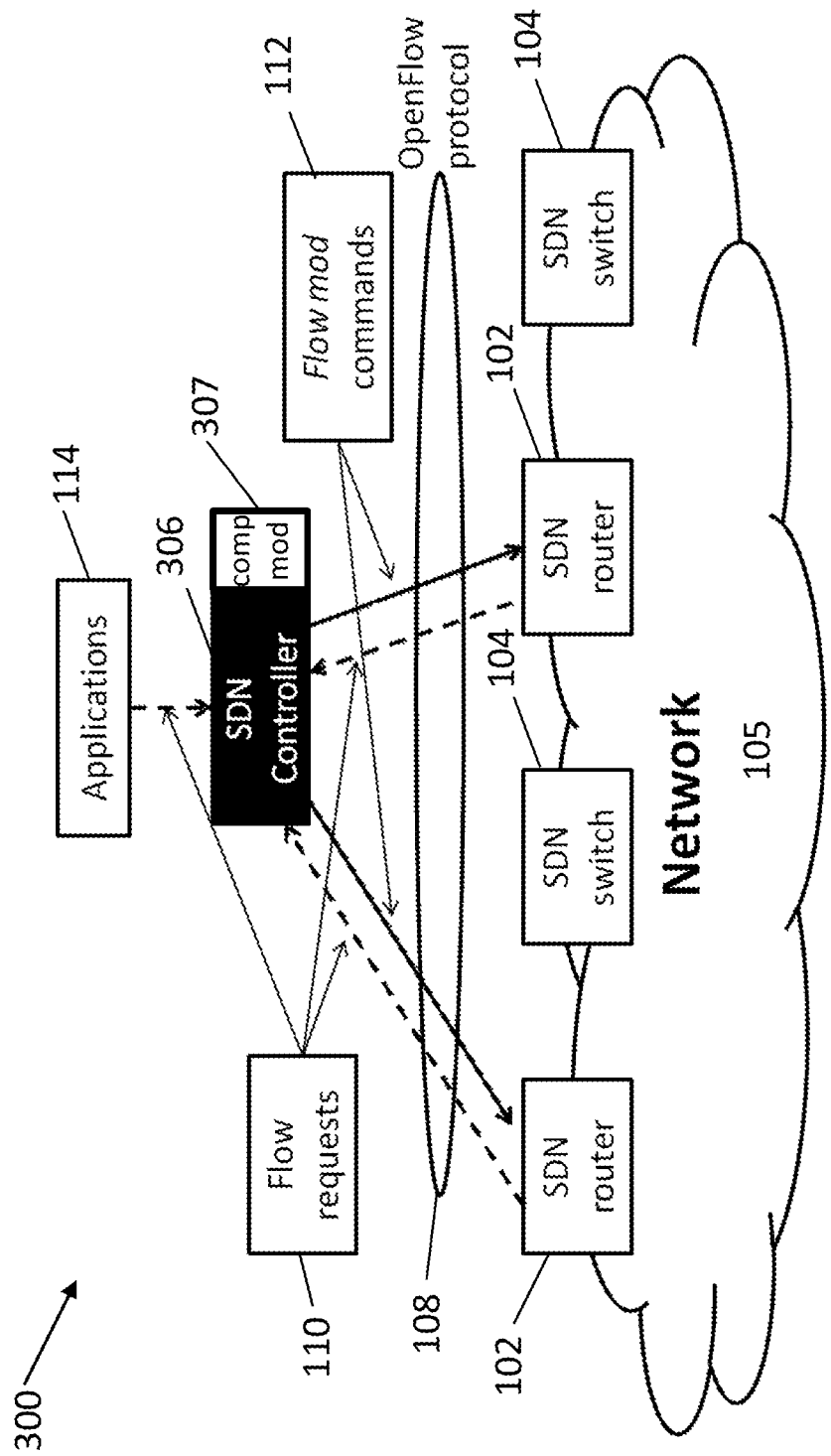
FIG. 3 schematically illustrates an exemplary SDN network architecture including a SDN controller with a disjoint constrained path computation module, according to an example of the present disclosure.

Reference is now made to FIG. 3 which schematically illustrates an exemplary SDN network architecture 300 including a centralized SDN controller 306 with a disjoint constrained path computation module 307, according to an example of the present disclosure. SDN network architecture 300 may resemble SDN architecture 100 in FIG. 1 in that it may include SDN routers 102 and SDN switches 104 which may interact over communications network 105 with SDN controller 306 which may decide the route that new incoming demands should take. Similar to SDN network architecture 100, SDN architecture may use OpenFlow protocol 108, flow request 110, and flow mod message 112, and SDN controller 306 may proactively configure routes in communications network 105 responsive to requests from applications 114.

Path computation module 307 may be configured to determine multiple disjoint constrained paths in communications network 105 using the exemplary method described with reference to the flow chart shown in FIG. 2 and which provides offering the least-cost solution.

Path computation module 307 may determine multiple disjoint constrained paths which include a pair of disjoint paths (two disjoint paths), and may additionally determine the disjoint paths for more than 2 disjoint paths, for example for k disjoint paths where k may be greater than or equal to two disjoint paths, for example, 3, 4, 5, 10, 20, 50, 100, 1000, or more disjoint paths. Path computation module 307 may be implemented in software and/or hardware, and may be integral to SDN controller 306 as part of the controller, or may be a separate item which with hardware and/or software connectivity to the controller.

Figure 4A:
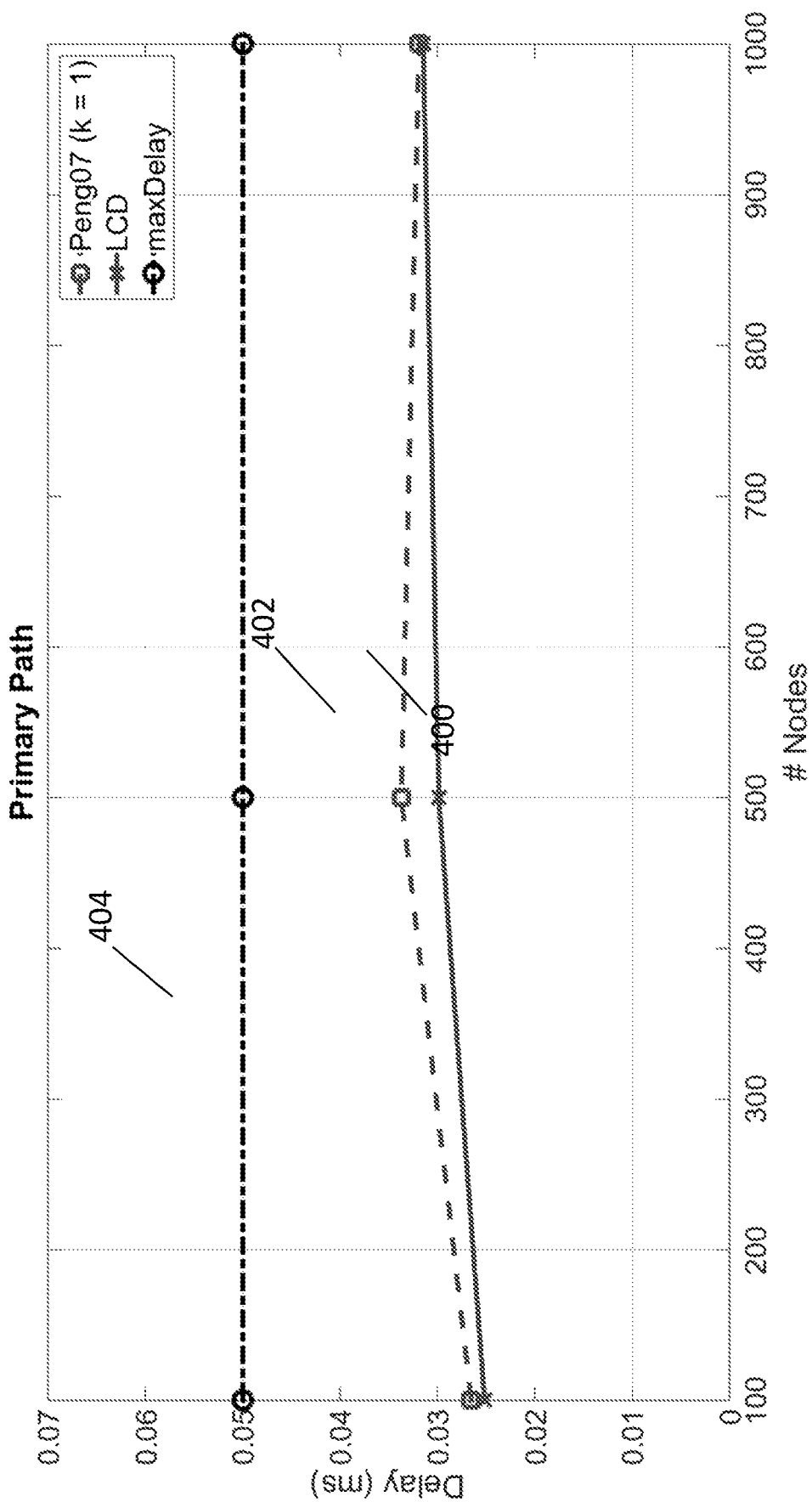
FIGS. 4A and 4B are graphs displaying comparative simulation results of performance analyses performed for a primary path and a secondary path, respectively, of a least-cost disjoint (LCD) pair of paths subject to delay constraints in a communications network using a SDN controller implementing the disjoint constrained computation method, according to an example of the present disclosure.
Figure 4B:
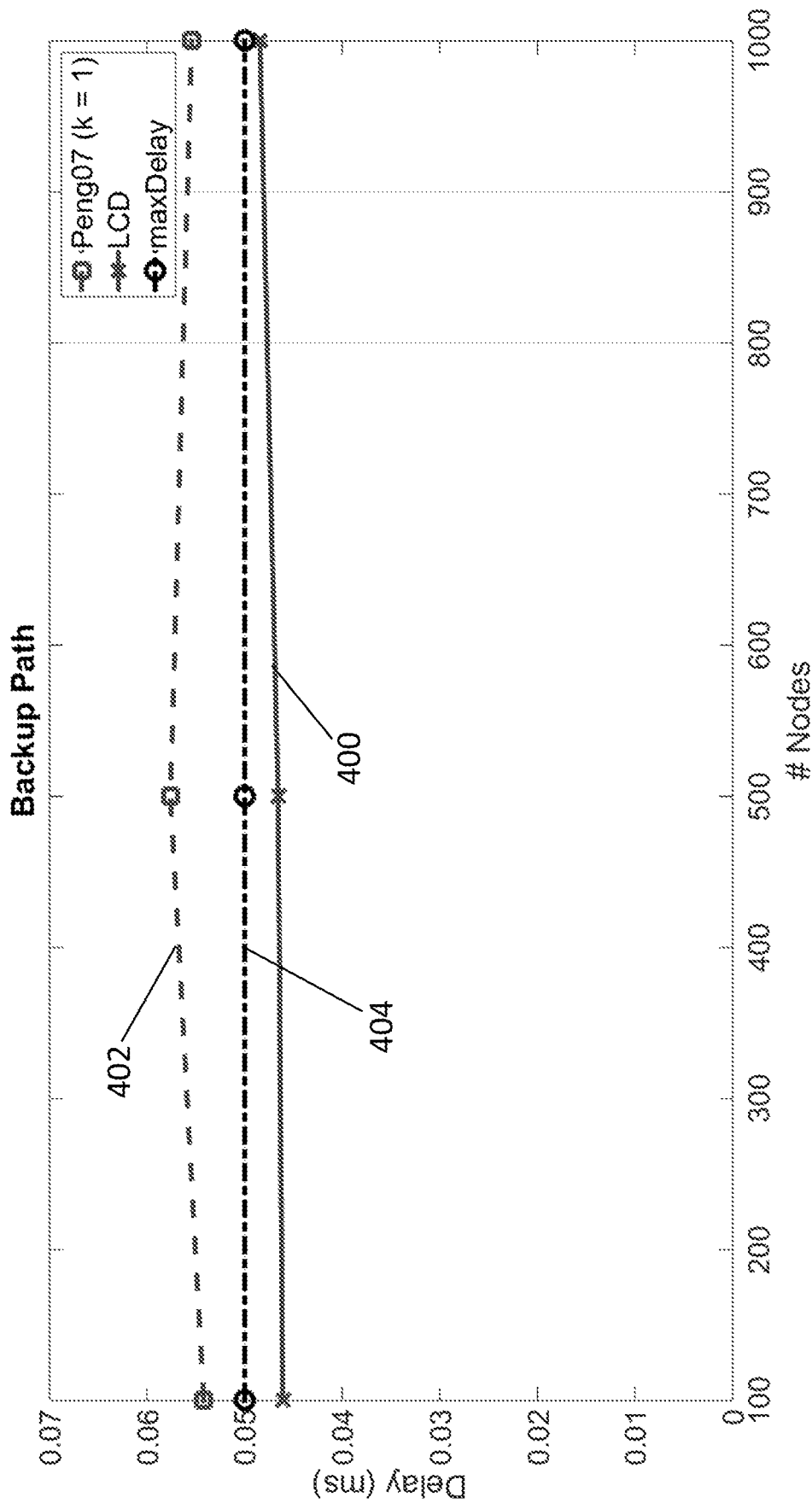

Reference is now made to FIGS. 4A and 4B which are graphs respectively displaying simulation results of comparative performance analyses performed for a primary path and a backup path of a minimum-cost disjoint pair of paths subject to delay constraints in a communications network. The simulation included using a SDN controller implementing a disjoint constrained computation method according to an example of the present disclosure, for example as described in the method of FIG. 2 which allows determination of a least-cost disjoint (LCD) path combination, and additionally included using a SDN controller implementing a disjoint constrained computation method.

The simulated implementation consisted in computing a minimum-cost disjoint pair of paths subject to delay constraints. The generation of paths was done by the Suurballe algorithm, allowing the computation of $\Delta min$ and $\Delta max$. For steps similar to that shown in FIG. 2 at 201, 204, and 207, the LARAC algorithm was used with $\Delta = \Delta 1 + \Delta 2$. In order to carry out a fair comparison between Peng's method and the LCD method according to an example of the present disclosure, the path delay was computed as the average of path delays on primary and backup paths.

The simulation setup considered the following:

a. the communication network included 100 to 1000 nodes;

b. E/N=3 (network density);

c. 0.05 ms threshold on primary and backup paths (total 0.1 ms); and d. 100 incoming demands to average results.

The results of the performance analysis associated with the LCD method is shown in FIGS. 4A and 4B by line 400 and indicated in the key as LCD, the performance analysis associated with Peng's method is shown in the Figures by line 402 and indicated in the key as Peng07, and the upper boundary for the delay constraint for the primary and backup paths and indicated in the key as maxDelay is shown in the Figures by line 404. As may be appreciated from FIG. 4A, both LCD and Peng07 determined paths which respect the delay constraint (lines 400 and 402 are below maxDelay 404), with LCD determining the primary path with the lowest delay. From FIG. 4B, it may be appreciated that LCD determined a backup path which respects the delay (line 400 is below maxDelay 404) while Peng07 does not. Peng07 determined a path which exceeds the upper boundary for the delay constraint (line 402 is above line 404). The total cost (sum on primary and backup paths) and an execution time (less than 3 msec) were comparable for both LCD and Peng07.

It is an object of the disclosure to provide a method and an apparatus for computing multiple disjoint constrained paths that address the above-identified problems, and guarantee the respect of QoS constraints on each path.

There is provided, in accordance with a first aspect of the present disclosure, a method of determining multiple disjoint constrained paths in a communications network, the method may include selecting as upper bounds QoS metrics for each path in a disjoint combination of paths having two or more disjoint paths between a source node and a destination node, and determining a minimum-cost disjoint path combination and a minimum-QoS metric disjoint path combination. The method may further include computing a maximum QoS metric by summing the QoS metrics of each minimum-cost path in the minimum-cost disjoint path combination, and computing a minimum QoS metric by summing the QoS metrics of each minimum-QoS metric path in the minimum-QoS metric disjoint path combination. The method may additionally include determining all minimum-cost disjoint path combinations within an interval between the maximum QoS and the minimum QoS, and selecting from all the minimum-cost disjoint path combinations within the interval all combinations having paths wherein the QoS metric of each path is within the upper bounds.

It may be appreciated that a method of computing a primary and a set of backup paths respecting a given set of constraints individually for each path may be particularly advantageous for use in a SDN or PCE communications network. For example, it may be used to compute multiple disjoint constrained paths where a "premium" path may be established with a short delay constraint and an adequate, yet less reactive path may be provisioned as a backup path.

In a first possible implementation of the method according to the first aspect, the method may further include selecting from the combinations having paths with QoS metrics within the upper bounds a least-cost disjoint path combination. In this way, the set of paths computed is optimal and guaranteed to respect the constraints imposed on each path.

In a second possible implementation form of the method according to the first aspect as such or according to the first implementation form of the first aspect, the disjoint path combination comprises a disjoint pair of paths. As in many applications just a primary and backup paths are required, searching only for a pair of disjoint paths broadens the space of candidate solutions and increases the probability that a feasible solution is found.

In a third possible implementation form of the method according to the first aspect as such or according to any of the preceding implementation forms of the first aspect, the step of determining a minimum-cost disjoint path combination comprises using any one or any combination of a Suurballe algorithm, a LARAC algorithm, a Dijkstra algorithm, a K-shortest path algorithm, a Binary Search algorithm, and a Local Search algorithm. These algorithms guarantee the optimal and fastest computation of the paths with the desired characteristics in terms of constraints and resiliency.

In a fourth possible implementation form of the method according to the first aspect as such or according to any of the preceding implementation forms of the first aspect, the step of determining all minimum-cost disjoint path combinations within an interval between the maximum QoS and the minimum QoS is done in parallel, sequentially, or any combination thereof. According to the available processing resources, the use of parallelism allows to speed up the computation of a feasible solution.

In a fifth possible implementation form according to the fourth implementation form of the first aspect, the step of determining all minimum-cost disjoint path combinations is performed over a plurality of subintervals of the intervals. Searching on several subintervals allows increasing the probability that a combination of paths respecting the constraints on each path is computed. In addition, using more subintervals allows parallelizing the search.

In a sixth possible implementation form of the method according to the first aspect as such or according to any of the preceding implementation forms of the first aspect, the QoS metrics comprise any one of a number of hops, physical distance, delay, or any other additive metric over links. In this way, this approach can be applied to several types of networks where the constraints to be considered are additive.

There is provided, in accordance with a second aspect of the present disclosure, an apparatus for determining multiple disjoint constrained paths in a communications network, the apparatus may be configured to select as upper bounds QoS metrics for each path in a disjoint combination of paths having two or more disjoint paths between a source node and a destination node, and may determine a minimum-cost disjoint path combination and a minimum-QoS metric disjoint path combination.

Preferably, the apparatus may compute a maximum QoS metric by summing the QoS metrics of each minimum-cost path in the minimum-cost disjoint path combination, and may compute a minimum QoS metric by summing the QoS metrics of each minimum-QoS metric path in the minimum-QoS metric disjoint path combination.

Preferably, the apparatus may determine all minimum-cost disjoint path combinations within an interval between the maximum QoS and the minimum QoS.

Preferably, the apparatus may select from all minimum-cost disjoint path combinations within the interval all combinations having paths wherein the QoS metric of each path is within the upper bounds.

In a first possible implementation form of the apparatus according to the second aspect, the apparatus is further configured to additionally select from the combinations having paths with QoS metrics within the upper bounds a least-cost disjoint path combination.

In a second possible implementation form of the apparatus according to the second aspect as such or according to the first implementation of the second aspect, the disjoint path combination may include a disjoint pair of paths.

In a third possible implementation form of the apparatus according to the second aspect as such or according to one of the first or second implementation forms of the second aspect, the determining may include using any one or any combination of a Suurballe algorithm, a LARAC algorithm, a Dijkstra algorithm, a K-shortest path algorithm, a Binary Search algorithm, and a Local Search algorithm.

In a fourth possible implementation form of the apparatus according to the second aspect as such or according to any preceding implementation forms of the second aspect, the apparatus is further configured to determine all minimum-cost disjoint path combinations within an interval between the maximum QoS and the minimum QoS in parallel, sequentially, or based on any combination thereof.

In a fifth possible implementation form of the apparatus according to the fourth implementation form of the second aspect, the apparatus is further configured to determine all minimum-cost disjoint path combinations over a plurality of subintervals of the intervals.

In a sixth possible implementation form of the apparatus according to the second aspect as such or according to any of the preceding implementation forms of the second aspect, the QoS metrics may include any one of a number of hops, physical distance, delay, and any other additive metric over links.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

While certain features of the disclosure have been illustrated and described herein, many modifications, substitutions, changes, and equivalents may occur to those of ordinary skill in the art and should be consider the part of this disclosure.

What is claimed is:

1. A method of determining multiple disjoint constrained paths in a communications network, comprising:
   selecting upper bound constraints of delay metrics for each path in a disjoint path combination comprising two or more disjoint paths between a source node and a destination node;
   determining a minimum-cost disjoint path combination and a minimum-delay disjoint path combination;
   computing a maximum delay constraint by summing the delay metrics of each path in the minimum-cost disjoint path combination, and computing a minimum delay constraint by summing the delay metrics of each path in the minimum-delay disjoint path combination;
   determining a candidate space including disjoint path combinations having a sum of delay metrics for paths in the disjoint path combination that fall within an interval between the maximum delay constraint and the minimum delay constraint; and
   selecting, from the candidate space, disjoint path combinations, wherein the delay metric of each path in the disjoint path combination is within the upper bound constraints.

2. The method according to claim 1, further comprising:
   selecting, from the disjoint path combinations comprising the paths with the delay metrics within the upper bounds, a least-cost disjoint path combination.

3. The method according to claim 1, wherein the disjoint path combination comprises a disjoint pair of paths.

4. The method according to claim 1, wherein determining the minimum-cost disjoint path combination comprises using at least one of: a Suurballe algorithm, a LARAC algorithm, a Dijkstra algorithm, a K-shortest path algorithm, a Binary Search algorithm, and a Local Search algorithm.

5. The method according claim 1, wherein the step of determining the minimum-cost disjoint path combinations within the interval between the maximum delay constraint and the minimum delay constraint is done in parallel, sequentially, or any combination thereof.

6. The method according to claim 5, wherein the step of determining the minimum-cost disjoint path combinations is done over a plurality of subintervals of the interval.

7. An apparatus for determining multiple disjoint constrained paths in a communications network, comprising a processor, and a non-transitory computer readable medium storing instructions that are executable by the processor, wherein the processor is configured to perform:
   selecting upper bound constraints of delay metrics for each path in a disjoint path combination comprising two or more disjoint paths between a source node and a destination node;
   determining a minimum-cost disjoint path combination, and a minimum-delay disjoint path combination;
   computing a maximum delay constraint by summing the delay metrics of each path in the minimum-cost disjoint path combination, and computing a minimum delay constraint by summing the delay metrics of each path in the minimum-delay disjoint path combination;
   determining a candidate space including minimum-cost disjoint path combinations having a sum of delay metrics for paths in the disjoint path combination that fall within an interval between the maximum delay constraint and the minimum delay constraint; and
   selecting, from the candidate space, disjoint path combinations, wherein the delay metric of each path in the disjoint path combination is within the upper bound constraints.

8. The apparatus according to claim 7, wherein the processor is further configured to perform:
   selecting, from the disjoint path combinations comprising the paths with the delay metrics within the upper bounds, a least-cost disjoint path combination.

9. The apparatus according to claim 7, wherein the disjoint path combination comprises a disjoint pair of paths.

10. The apparatus according to claim 7, wherein the processor configured for determining the minimum-cost disjoint path combination is performed by using at least one of: a Suurballe algorithm, a LARAC algorithm, a Dijkstra algorithm, a K-shortest path algorithm, a Binary Search algorithm, and a Local Search algorithm.

11. The apparatus according to claim 7, wherein the determining the minimum-cost disjoint path combinations within the interval between the maximum delay constraint and the minimum delay constraint is performed in parallel, sequentially, or any combination thereof.

12. The apparatus according to claim 11, wherein the determining the minimum-cost disjoint path combinations is performed over a plurality of subintervals of the interval.

13. A non-transitory computer-readable storage medium having stored therein instructions for determining multiple disjoint constrained paths in a communications network, wherein the instructions, when executed by a processor, cause the processor to:
   select upper bound constraints of delay metrics for each path in a disjoint path combination comprising two or more disjoint paths between a source node and a destination node;
   determine a minimum-cost disjoint path combination and a minimum-delay disjoint path combination;
   compute a maximum delay constraint by summing the delay metrics of each path in the minimum-cost disjoint path combination, and compute a minimum delay constraint by summing the delay metrics of each path in the minimum-delay disjoint path combination;
   determine a candidate space including disjoint path combinations having a sum of delay metrics for paths in the disjoint path combination that fall within an interval between the maximum delay constraint and the minimum delay constraint; and
   select, from the candidate space, disjoint path combinations wherein the delay metric of each path in the disjoint path combination is within the upper bound constraints.

14. The non-transitory computer-readable storage medium according to claim 13, wherein the instructions further cause the processor to select, from the disjoint path combinations comprising the paths with the delay metrics within the upper bounds, a least-cost disjoint path combination.

15. The non-transitory computer-readable storage medium according to claim 13, wherein the disjoint path combination comprises a disjoint pair of paths.

16. The non-transitory computer-readable storage medium according to claim 13, wherein the instructions cause the processor to determine the minimum-cost disjoint path combinations within the interval between the maximum delay constraint and the minimum delay constraint in parallel, sequentially, or any combination thereof.

17. The non-transitory computer-readable storage medium according to claim 16, wherein the instructions cause the processor to determine the minimum-cost disjoint path combinations over a plurality of subintervals of the interval.

* * * * *